No. 849,713. PATENTED APR. 9, 1907.
E. F. W. ALEXANDERSON.
DYNAMO ELECTRIC MACHINE.
APPLICATION FILED JUNE 29, 1905.

Witnesses:
Burchard V. Kelley

Inventor:
Ernst F. W. Alexanderson
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

DYNAMO-ELECTRIC MACHINE.

No. 849,713.

Specification of Letters Patent.

Patented April 9, 1907.

Application filed June 29, 1905. Serial No. 267,509.

*To all whom it may concern:*

Be it known that I, ERNST F. W. ALEXANDERSON, a subject of the King of Norway and Sweden, residing at Schenectady, county of Schenectady, State of New York, have invented certain new and useful Improvements in Dynamo-Electric Machines, of which the following is a specification.

My invention relates to dynamo-electric machines, and is particularly applicable to self-exciting alternators of the type described in Patent No. 789,476, issued to me May 9, 1905. In that patent I disclosed a self-exciting alternating-current machine comprising a field-winding provided with a rectifying-commutator and means for supplying to the field-winding through the commutator superposed voltages derived from the armature-winding in shunt and in series, respectively. A convenient method of obtaining the shunt excitation is through an auxiliary winding carried by the armature, and by means of this arrangement the expense of shunt-transformers is saved.

My present invention comprises a novel arrangement of the auxiliary winding, and consists in forming it of conducting-strips placed between the main armature-coils and the retaining-wedges therefor.

My invention further comprises slotting the inner side of the retaining-wedges in order to hold the conducting-strips securely in place.

Placing the auxiliary winding at the top of the slot directly beneath the wedges and above the main winding gives it the most favorable position as regards reactance, while this arrangement does not increase the size of the machine.

My invention will best be understood by reference to the accompanying drawings, in which—

Figure 2:
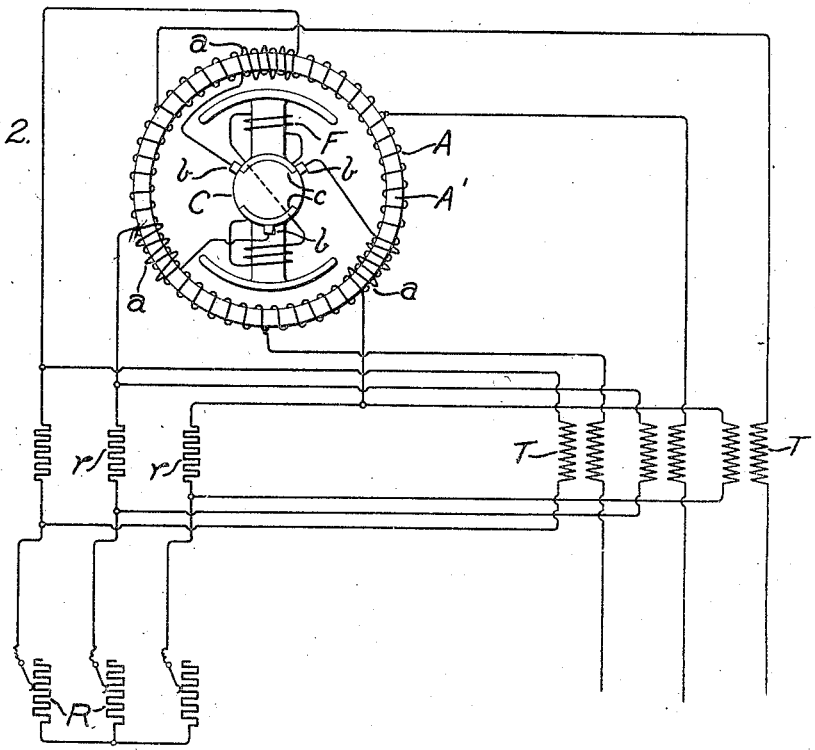
Figure 1:
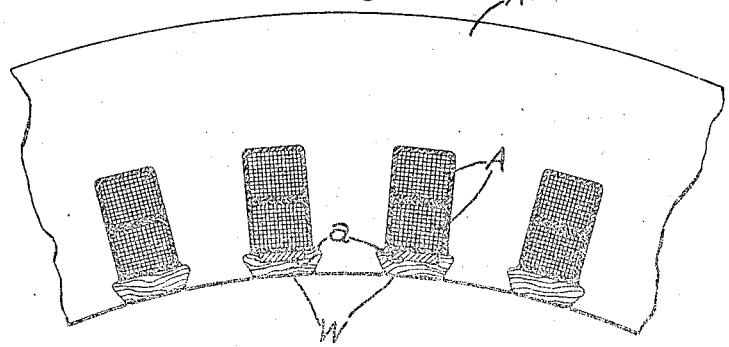

Figure 1 shows a small section of the armature of a dynamo-electric machine provided with an auxiliary winding arranged in accordance with my invention, and Fig. 2 shows a diagram of the connections of a machine of a type to which my invention is particularly applicable.

In Fig. 1, A' represents an armature-core which is built up of laminations in the usual manner. A represents the main armature-coils, which are carried in the slots and held in place by retaining-wedges W, of wood or other suitable material. $a$ represents an auxiliary winding which is composed of conducting-strips placed in the slots beneath the wedges and above the main armature-coils. In order to hold these strips securely in place, the inner sides of the wedges are slotted, as shown. These strips are placed in as many slots as necessary to give the desired voltage, and the strips are connected to give a winding of any desired character.

In Fig. 2 are shown the connections of a machine of the type described in my former patent above mentioned, to which the arrangement of the auxiliary winding above described is particularly applicable. In this figure, A represents the main armature-winding, and $a$ the auxiliary winding. For the sake of simplicity both windings are shown as Gramme-ring windings. F represents the field-winding, which is provided with a rectifying-commutator C. This commutator is of the type disclosed in my former patent, comprising a polyphase arrangement of brushes $b\ b$ and segments of a length substantially equal to the distance between brushes.

As fully explained in my former patent, if a polyphase voltage is impressed upon the brushes a rectified current will be delivered to the field-winding. The arrangement of brushes shown is adapted for a three-phase excitation, and the auxiliary winding $a$ is consequently arranged and connected in three phase. Resistances $r$ are placed in series with the several phases of the auxiliary winding, and across the terminals of these resistances are connected the secondaries of transformers T T, the primaries of which are in series with the main armature-winding. These transformers serve to impress across the terminals of the resistances $r$ in series with the auxiliary winding voltages corresponding in amount and phase to the armature-current. These transformers are so connected to the resistances that the phase impressed across the terminals of the resistances $r$ is ninety degrees from the phase of the voltage of the auxiliary winding when the load on the machine is non-inductive. This arrangement, as fully explained in my former patent, gives proper compounding for both inductive and non-inductive loads.

R represents a field-rheostat, by means of which the voltage of the machine may be regulated in the usual manner.

With the arrangement as described above it will be seen that the expense of employing shunt-transformers for supplying the shunt-field excitation is eliminated, and the auxiliary winding which performs the function of the shunt-transformers is so arranged as not to increase the size of the machine. Furthermore, the location of the auxiliary winding is such as to give it a minimum reactance, which is highly advantageous as regards commutation.

What I claim as new, and desire to secure by Letters Patent of the United States, is—

1. In a dynamo-electric machine, a field-winding provided with a rectifying-commutator, a slotted armature-core, a main armature-winding carried in said slots, retaining means for said armature-winding, and an auxiliary winding connected to said field-winding through said commutator, said auxiliary winding being composed of conducting-strips carried beneath said retaining means and above the main armature-winding.

2. In a dynamo-electric machine, a slotted core, a main winding carried in said slots, retaining-wedges for said winding provided with slots on their inner sides, and an auxiliary winding comprising conducting-strips carried in the slots in said wedges.

3. In a dynamo-electric machine, a field-winding provided with a rectifying-commutator, a slotted armature-core, a main armature-winding carried in said slots, retaining-wedges for said armature-winding having slots on their inner sides, and an auxiliary winding connected to said field-winding through said commutator, said auxiliary winding being composed of conducting-strips carried in the slots in said wedges.

In witness whereof I have hereunto set my hand this 27th day of June, 1905.

ERNST F. W. ALEXANDERSON.

Witnesses:
BENJAMIN B. HULL,
HELEN ORFORD.